US010711747B2

(12) United States Patent
Yaginuma (10) Patent No.: US 10,711,747 B2
(45) Date of Patent: Jul. 14, 2020

(54) DIESEL POWER GENERATION SYSTEM USING BIOFUEL

(71) Applicant: NIPPON PREMIUM CO., LTD., Tokyo (JP)

(72) Inventor: Noriyuki Yaginuma, Miyagi (JP)

(73) Assignee: NIPPON PREMIUM CO., LTD., Tokyo (JP)

( * ) Notice: Subject to any disclaimer, the term of this patent is extended or adjusted under 35 U.S.C. 154(b) by 45 days.

(21) Appl. No.: 16/303,063

(22) PCT Filed: May 18, 2017

(86) PCT No.: PCT/JP2017/019443
§ 371 (c)(1),
(2) Date: Nov. 19, 2018

(87) PCT Pub. No.: WO2017/200110
PCT Pub. Date: Nov. 23, 2017

(65) Prior Publication Data
US 2019/0316553 A1    Oct. 17, 2019

(30) Foreign Application Priority Data

May 19, 2016  (JP) .................................. 2016-112219

(51) Int. Cl.
*F02M 37/00* (2006.01)
*F28D 7/10* (2006.01)
(Continued)

(52) U.S. Cl.
CPC ............. *F02M 37/00* (2013.01); *F28D 7/106* (2013.01); *F02D 19/0652* (2013.01);
(Continued)

(58) Field of Classification Search
CPC ...... F02M 37/00; F02M 31/16; F02M 31/125; F28D 7/106; F02D 19/0676; F02D 19/0652
See application file for complete search history.

(56) References Cited

U.S. PATENT DOCUMENTS

2008/0220486 A1    9/2008  Weiss
2009/0250276 A1   10/2009  Goodwin et al.
(Continued)

FOREIGN PATENT DOCUMENTS

JP    63-85250 A      4/1988
JP    2000-160171 A   6/2000
(Continued)

OTHER PUBLICATIONS

International Search Report (ISR) and Written Opinion (WO) dated Aug. 15, 2017 for Application No. PCT/JP2017/019443.
(Continued)

*Primary Examiner* — Xiao En Mo
(74) *Attorney, Agent, or Firm* — Ladas & Parry LLP (57) ABSTRACT

The present invention provides a diesel power generation system using biofuel capable of reliably generating electric power using biofuel so as not to coagulate, whereby biofuel is used to drive the diesel engine and the generator is driven based on the driving force of the diesel engine to generate electricity, while driving the diesel engine with the desired efficiency, the biofuel is not solidified without deteriorating at high temperature.

The diesel power generation system 10 using the biofuel of the present invention is provided with a first fuel heater 22 for heating the biofuel sent by the fuel feed pump 20 through the fuel feed circuit 18 to a second temperature range set lower than the first temperature range in which the diesel engine 14 is driven with a predetermined efficiency, a second fuel heater 24 disposed in a portion of the fuel feed circuit (Continued)

18 between the first fuel heater 22 and the diesel engine 14 and heating the biofuel flowing therethrough, a temperature sensor 26 interposed on the upstream side of the diesel engine 14 of the fuel feed circuit 18 and measuring the temperature of biofuel flowing into the diesel engine 14, and, a control device 28 for controlling the second fuel heater 24 so that the biofuel flowing into the diesel engine 14 is maintained within the first temperature range, based on the measurement result of the temperature sensor 26.

16 Claims, 7 Drawing Sheets (51) Int. Cl.
  *F02D 19/06* (2006.01)
  *F02M 31/125* (2006.01)
  *F02M 31/16* (2006.01)

(52) U.S. Cl.
  CPC ....... *F02D 19/0676* (2013.01); *F02M 31/125* (2013.01); *F02M 31/16* (2013.01)

(56) References Cited

U.S. PATENT DOCUMENTS

| | | | |
|---|---|---|---|
| 2010/0107475 A1 | 5/2010 | Nair et al. | |
| 2011/0017532 A1 | 1/2011 | Langford et al. | |

FOREIGN PATENT DOCUMENTS

| | | | |
|---|---|---|---|
| JP | 2008-30915 A | 2/2008 | |
| JP | 2008-215332 A | 9/2008 | |
| JP | 2010-519926 A | 6/2010 | |
| JP | 2010-531912 A | 9/2010 | |
| JP | 2010-265868 A | 11/2010 | |
| JP | 2011-500418 A | 1/2011 | |
| JP | 2011-27007 A | 2/2011 | |
| JP | 2011-514859 A | 5/2011 | |
| JP | 2012-82761 A | 4/2012 | |
| JP | 2013-181417 A | 9/2013 | |
| JP | 2014-74147 A | 4/2014 | |
| JP | 2014-171301 A | 9/2014 | |
| JP | 2015-7415 A | 1/2015 | |
| JP | 2015-63935 A | 4/2015 | |
| JP | 2015-83461 A | 4/2015 | |
| WO | 2007/043031 A1 | 4/2007 | |
| WO | 2008/107896 A2 | 9/2008 | |
| WO | WO 2008/107896 A2 | 9/2008 | |
| WO | 2009/004652 A1 | 1/2009 | |
| WO | WO 2009/004652 A1 | 1/2009 | |
| WO | 2009/050456 A2 | 4/2009 | |
| WO | WO 2009/050456 A2 | 4/2009 | |
| WO | 2009/102898 A1 | 8/2009 | |
| WO | WO 2009/102898 A1 | 8/2009 | |

OTHER PUBLICATIONS

J-PlatPat English abstract of JP 2000-160171 A.
J-PlatPat English abstract of JP 2010-265868 A.
J-PlatPat English abstract of JP 2011-27007 A.
J-PlatPat English abstract of JP 2015-7415 A.
J-PlatPat English abstract of JP 2015-63935 A.
J-PlatPat English abstract of JP 2013-181417 A.
J-PlatPat English abstract of JP 2008-215332 A.
J-PlatPat English abstract of JP 2015-83461 A.
J-PlatPat English abstract of JP 2014-171301 A.
J-PlatPat English abstract of JP 2014-74147 A.
J-PlatPat English abstract of JP 2008-30915 A.
Espacenet English abstract of JP 2011-514859 A.
Espacenet English abstract of JP 2011-500418 A.
Espacenet English abstract of JP 2010-531912 A.
Espacenet English abstract of JP 2010-519926 A.
J-PlatPat English abstract of JP 63-85250 A.
J-PlatPat English abstract of JP 2012-82761 A.

DIESEL POWER GENERATION SYSTEM USING BIOFUEL

RELATED APPLICATION

This application is an application under 35 U.S.C. 371 of International Application No. PCT/JP2017/019443 filed on May 18, 2017, the entire contents of which are incorporated herein by reference.

TECHNICAL FIELD

The present invention relates to a diesel power generation system using biofuel that drives a diesel engine using biofuel and drives a generator based on the driving force of the diesel engine to generate electricity.

BACKGROUND ART

Conventionally, techniques for driving a diesel engine using biofuel and driving a generator based on the driving force of the diesel engine to generate electricity have been proposed many times. As these conventional techniques, most of the techniques relating to so-called hybrid power generation in which diesel power generation using biofuel is combined with a power generation system mainly using technologies related to the production of biofuel and fossil fuels such as gasoline and Class-A heavy fuel oil (Bunker A) are used.

Concretely, technologies have been conventionally proposed as shown in Patent Documents 1 to 9.
Patent Document 1 JP-A-2015-83461
Patent Document 2 JP-A-2014-171301
Patent Document 3 JP-A-2014-74147
Patent Document 4 JP-A-2008-30915
Patent Document 5 JP-A-2011-514859
Patent Document 6 JP-A-2011-500418
Patent Document 7 JP-A-2010-531912
Patent Document 8 JP-A-2010-519926
Patent Document 9 JP-A-63-85250
Here, the prior art described in Patent Document 1 mentioned above relates to a hybrid electric vehicle and a method of manufacturing the hybrid electric vehicle, wherein the cruising distance is longer, the battery pack is more compact, and a lighter hybrid which uses little fossil fuel Technologies related to electric vehicles are disclosed. Further, the above-described prior art described in Patent Document 2 relates to a vehicle using electric power from thermal photovoltaic power generation using heat as a power source, which discloses a technology relating to an electric vehicle that is capable of traveling immediately after getting on, has a long traveling distance, has a simple structure and has high energy efficiency.

In addition, the prior art described in Patent Document 3 described above recovers used tempura oil (waste edible oil) discharged from homes and business establishments, removes and refines oxidation/degradation products, and uses petroleum kerosene and 50:50 or 40:60 (kerosene 40%), adding predetermined additives in an amount of 0.01 to 0.2 wt. %, completely dispersing and dissolving each other by ultrasonic irradiation method, wherein technologies related to bio fuel oils that are inexpensive and friendly to the global environment are disclosed. In addition, the prior art described in the above-mentioned patent document 4 relates generally to power generation and efficient recovery of carbon dioxide, specifically, to reduction of NOx emissions and integration of gas turbine exhaust gas recirculation, and which discloses a technology relating to an exhaust gas recirculation type power generation system.

In addition, the prior art described in Patent Document 5 described above is similar to the contents described in the above-mentioned Patent Document 1, and discloses a hybrid electric vehicle, a part design thereof, and a related technique. Further, the prior art described in Patent Document 6 relates to a hybrid vehicle, specifically to a hybrid transmission mechanism (power train), which includes an electric motor for driving a pair of wheels of a vehicle, and an electric motor and an energy storage means electrically connected to the electric motor for supplying the electric power to the electric motor.

Further, the prior art described in Patent Document 7 mentioned above relates to biofuel, an industrial distilled cashew nut shell liquid (CNSL) as one component of biofuel, a technique relating to the manufacturing method and compounding method thereof disclosed doing. The prior art described in Patent Document 8 mentioned above relates to bioconversion of carbon dioxide in a flue gas by a photosynthetic organism, and in a method of growing photosynthetic organisms, a fossil fuel Comprising the step of providing exhaust gas from a power plant to an organism, wherein the gas has been desulfurized beforehand. Carbon dioxide ($CO_2$) in the exhaust gas rises above the concentration of carbon dioxide released from the power plant. Further disclosed is a method of producing omega fatty acids and biofuels comprising the step of growing microalgae by providing exhaust gases from a fossil fuel power plant to said microalgae.

Still, furthermore, the prior art described in the above-mentioned Patent Document 9 discloses a technique for setting the heating temperature to 60° C. when heating the palm oil flowing through the pipe leading from the fuel tank to the diesel engine It is nothing, in the situation where the purification technology of palm oil is still immature, it is common sense that the protein component solidifies at the heating temperature of palm oil at 60° C., and a solid content is produced in the palm oil, which causes filter clogging in the era. If the heating temperature of the palm oil flowing through the pipe leading from the fuel tank to the diesel engine is set to 60° C. classified as a low temperature as described above, the temperature difference for heating the palm oil after being supplied to the diesel engine becomes It is inevitable to control the temperature in a high temperature region, and when the temperature exceeds 100° C., problems such as difficulty in maintaining quality due to high temperature deterioration occur separately.

In this way, in the technology of driving a diesel engine using a conventional biofuel and driving a generator based on the driving force of the diesel engine to generate electricity, there are hybrid power generation systems mounted in vehicles, in the power generation system which is related only to technology and biofuel composition and actually drives a diesel engine using biofuel and drives a generator based on the driving force of this diesel engine to generate electric power Without recognizing the problem related to the solidification of the fuel generated in the fuel tank, it did not include any suggestion to solve this problem.

SUMMARY OF THE INVENTION

The present invention has been made in consideration of the above circumstances, and it is an object of the present invention to provide a diesel power generation system that drives a diesel engine using biofuel, drives a generator based on the driving force of the diesel engine, whereby providing advantageous capability of reliably generating electric power by using biofuel while preventing the biofuel from solidifying as well as deterioration thereof at high temperature.

In order to solve the above problems and achieve the object, according to a first embodiment of the diesel power generation system using biofuel according to the present invention, comprises:

a first fuel reservoir for storing biofuel;

a diesel engine driven by using the biofuel supplied from the first fuel reservoir, said diesel engine being driven with a predetermined efficiency in a state where the biofuel is set in a first temperature range;

a generator that generates electricity with the driving force of the diesel engine;

a first fuel feed circuit connecting the first fuel reservoir and the diesel engine and through which the biofuel flows;

a first fuel feed pump interposed in the first fuel feed circuit for supplying biofuel in the first fuel reservoir to the diesel engine;

a first fuel heater for heating the biofuel sent by the first fuel feed pump to a second temperature range set lower than the first temperature range, being interposed in a portion on the downstream side of the first fuel feed pump of the first fuel feed circuit;

a second fuel heater disposed in that portion of the first fuel feed circuit which is located between the first fuel heater and the diesel engine, for heating the biofuel flowing through that portion;

a temperature sensor interposed on an upstream side of the diesel engine of the first fuel feed circuit, for measuring a temperature of biofuel flowing into the diesel engine; and a control device for controlling the biofuel flowing into the diesel engine to heat the biofuel by the second fuel heater based on the measurement result of the temperature sensor such that the biofuel is maintained within the first temperature range.

The diesel power generation system using a biofuel of a second aspect according to the present invention, is characterized in that the first fuel heater is a hot-water heater which uses warm water heated by exhaust heat from the diesel engine, and heating the biofuel so as to be in the second temperature range.

The diesel power generation system using a biofuel of a third aspect according to the present invention, is characterized in that the second fuel heater is provided with an electric heater which is intermittent in heat generation state under the control of the control device.

The diesel power generation system using a biofuel of a 4th aspect according to the present invention, is characterized in that the electric heater is attached to an outer peripheral portion of a pipe constituting the first fuel feed circuit between the first fuel heater and the diesel engine.

The diesel power generation system using a biofuel of a 5th aspect according to the present invention, is characterized in that the temperature sensor is attached to a portion of the first fuel feed circuit directly upstream of the diesel engine and measures the temperature of the biofuel immediately before flowing into the diesel engine, and the control device controls the second fuel heater so that the temperature of the biofuel immediately before flowing into the diesel engine is kept constant at a predetermined temperature within the first temperature range.

The diesel power generation system using a biofuel of a 6th aspect according to the present invention, is characterized in that the electric heater is configured to independently heat each of the divided portions in a state where the portion of the first fuel feed between the first fuel heater and the diesel engine is divided into a plurality of portions, and the control device controls the heat generation of at least one of the electric heaters.

The diesel power generation system using a biofuel of a 7th aspect according to the present invention, is characterized in that a third fuel heater is disposed in the first fuel reservoir to heat the biofuel stored in the first fuel reservoir to a third temperature range lower than the second temperature range.

The diesel power generation system using a biofuel of a 8th aspect according to the present invention, is characterized in that the third fuel heater heats the biofuel in the first fuel reservoir to the third temperature range by using warm water heated by exhaust heat from the diesel engine.

The diesel power generation system using a biofuel of a 9th aspect according to the present invention, is characterized in that the first oil reservoir has a capacity to store biofuel for at least a single day consumption.

The diesel power generation system using a biofuel of a 10th aspect according to the present invention, is characterized in that a second fuel reservoir in which biofuel for a plurality of days consumed is stored is connected to the first fuel reservoir via a second fuel feed circuit, and a second fuel feed pump for supplying and refilling the biofuel reserved in the second fuel reservoir tank to the first fuel reservoir tank is interposed in this second fuel feed circuit.

The diesel power generation system using a biofuel of a 11th aspect according to the present invention, is characterized in that the second fuel reservoir stores approximately 10 times the amount of biofuel of the first fuel reservoir.

The diesel power generation system using a biofuel of a 12th aspect according to the present invention, is characterized in that a fourth fuel heater for heating the biofuel stored in the second fuel reservoir tank so as to be in a fourth temperature range lower than the third temperature range is disposed in the second fuel reservoir.

The diesel power generation system using a biofuel of a 13th aspect according to the present invention, is characterized in that the fourth fuel heater heats the biofuel in the second fuel reservoir to the fourth temperature range by using warm water heated by exhaust heat from the diesel engine.

The diesel power generation system using a biofuel of a 14th aspect according to the present invention, is characterized in that the fourth temperature range is set higher than the temperature at which the biofuel solidifies.

The diesel power generation system using a biofuel of a 15th aspect according to the present invention, is characterized in that a third fuel feed circuit for returning the surplus biofuel discharged from the diesel engine to the first fuel reservoir is connected to the diesel engine, and a first cooler for lowering the temperature of biofuel being returned is interposed in the third fuel delivery circuit.

The diesel power generation system using a biofuel of a 16th aspect according to the present invention, is characterized in that the first cooler cools the biofuel by exchanging heat with the cooling water.

The diesel power generation system using a biofuel of a 17th aspect according to the present invention, is characterized by further comprising: a fourth fuel feed circuit connecting a portion of the first fuel feed circuit between the first fuel heater and the diesel engine and a portion of the third fuel feed circuit between the diesel engine and the first cooler, and a first pressure regulating valve interposed in the fourth fuel feed circuit and set to be opened at a predetermined pressure, and characterized in that when the biofuel being delivered by the first fuel feed circuit is boosted to the predetermined pressure or more, the first pressure regulating valve opens and the biofuel in the first fuel feed circuit is brought into contact with the biofuel returned to the third fuel feed circuit, and it is returned to the first fuel reservoir after being cooled by the first cooler.

The diesel power generation system using a biofuel of a 18th aspect according to the present invention, is characterized by further comprising: a third fuel reservoir storing Class-A heavy fuel oil, a first switching valve interposed in a portion of the first fuel feed circuit on the upstream side of the diesel engine, a fifth fuel feed circuit connecting between the first switching valve and the third fuel reservoir to circulate the Class-A heavy fuel oil, and a third fuel feed pump interposed in the fifth fuel feed circuit for feeding Class-A heavy fuel oil in the third fuel reservoir to the diesel engine, and characterized in that the control device, at a time of startup and flushing, activates the third fuel feed pump, and performs the first switching valve to closes the input from the first fuel feed circuit, open the fifth fuel feed, so that the Class-A heavy fuel oil is switched to be supplied to the diesel engine, and at a time of steady operation other than during startup and flushing, the third fuel transfer pump is stopped and performs the first switching valve to close the input from the fifth fuel feed circuit and open the input from the first fuel feed so that the biofuel is fed to the diesel engine.

The diesel power generation system using a biofuel of a 19th aspect according to the present invention, is characterized by further comprising: a second switching valve interposed in a portion of the third fuel transferring circuit downstream of the diesel engine and a sixth fuel feed circuit connecting the second switching valve and the third fuel reservoir to return excess Class-A heavy fuel oil discharged from the diesel engine to the third fuel reservoir, and characterized in that the control devise, at the time of startup and flushing, performs the second switching valve to close the output of the third fuel feed circuit and open the output to the sixth fuel feed circuit so that the Class-A heavy fuel oil discharged from the diesel engine flows through the sixth fuel feed circuit, and at the time at the time of steady operation, performs the second switching valve to open the output to the third fuel feed circuit and close the output to the sixth fuel feed circuit so that the biofuel discharged from the diesel engine to flow through the third fuel feed circuit.

The diesel power generation system using a biofuel of a 20th aspect according to the present invention, is characterized in that a second cooler for lowering the temperature of Class-A heavy fuel oil being fed is interposed in the sixth fuel feed circuit.

The diesel power generation system using a biofuel of a 21th aspect according to the present invention, is characterized in that the second cooler cools the Class-A heavy fuel oil by exchanging heat with the cooling water.

The diesel power generation system using a biofuel of a 22th aspect according to the present invention, is characterized by further comprising a seventh fuel feed circuit connecting between a portion between the first switching valve and the third fuel feed pump of the fifth fuel feed circuit and the sixth fuel feed circuit, and a second pressure regulating valve that opens at a predetermined pressure is interposed in the seventh oil sending circuit, and characterized in that when the Class-A heavy fuel oil being fed by the fifth fuel feed circuit is boosted to the predetermined pressure or more, the second pressure regulating valve opens and the Class-A heavy fuel oil in the fifth fuel feed circuit is returned to the third fuel reservoir via the sixth fuel feed circuit.

The diesel power generation system using a biofuel of a 23th aspect according to the present invention, is characterized by further comprising a third switching valve interposed in the sixth fuel feed circuit, a recovery tank for recovering Class-A heavy fuel oil discharged from the diesel engine at the time of flushing, and an eighth fuel feed circuit connecting between the third switching valve and the recovery tank, and characterized in that the control device, at the time of starting, performs the third switching valve to close the output to the eighth fuel feed circuit and open the output to the sixth fuel feed circuit so that the A heavy oi flows through the sixth fuel feed circuit, and at the time of flushing, performs the third switch valve to open the output to the eighth fuel feed circuit and close the output of the sixth fuel feed circuit so that a mixture of Class-A heavy fuel oil and biofuel discharged from the diesel engine is recovered to the recovery tank via the eighth fuel feed circuit.

The diesel power generation system using a biofuel of a 24th aspect according to the present invention, is characterized in that the diesel power generation system using a biofuel of a 21th aspect according to the present invention, is characterized in that a palm oil is used as the biofuel.

The diesel power generation system using a biofuel of a 25th aspect according to the present invention, is characterized in that the first temperature range is a temperature range of 80° C. to 100° C.

As described above, the diesel power generation system using the biofuel of the present invention is provided with the first fuel heater for heating the biofuel sent by the fuel feed circuit to a second temperature range set lower than the first temperature range in which the diesel engine is driven with a predetermined efficiency, the second fuel heater disposed in that portion of the first fuel feed circuit between the first fuel heater and the diesel engine, for heating the biofuel flowing through that portion, the temperature sensor interposed on the upstream side of the diesel engine of the fuel feed circuit, for measuring the temperature of biofuel flowing into the diesel engine, and the control device for controlling the biofuel flowing into the diesel engine by the second fuel heater based on the measurement result of the temperature sensor such that the biofuel is maintained within the first temperature range. As a result, according to the present invention, when driving a diesel engine using biofuel and driving a generator based on the driving force of the diesel engine to generate electricity, the diesel engine is driven at a desired efficiency and a biofuel, so it is possible to provide a diesel power generation system using biofuel which can reliably generate power using biofuel by preventing the fuel from solidifying without deteriorating at high temperature.

BEST MODE FOR CARRYING OUT THE INVENTION

Hereinafter, a configuration of one embodiment of a diesel power generation system using palm oil as a biofuel according to the present invention will be described with reference to FIG. 1 and FIG. 2 of the accompanying drawings.

Figure 1:
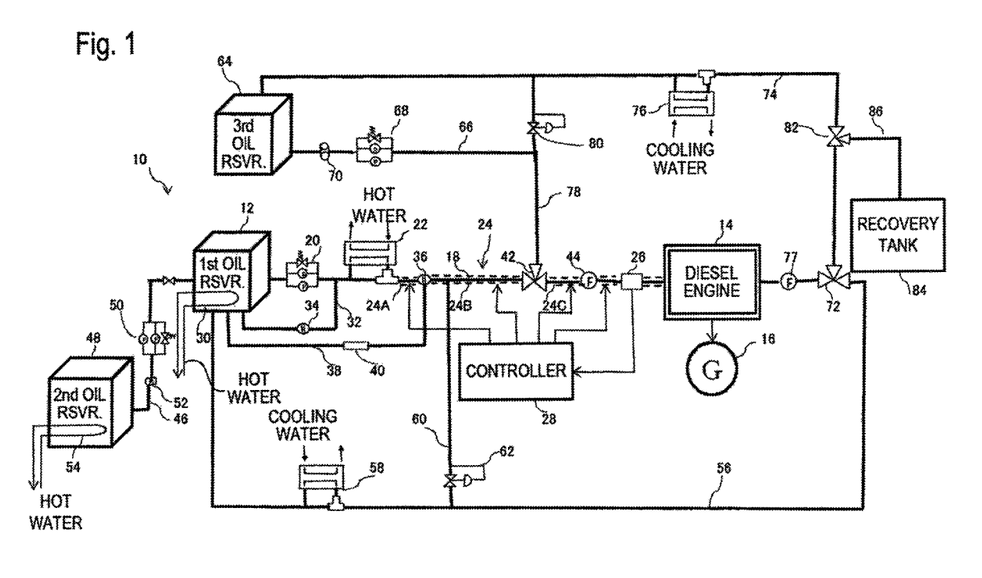
FIG. 1 is a fuel system diagram showing a configuration of one embodiment of a diesel power generation system using biofuel according to the present invention.

FIG. 1 is a diagram showing a fueling system which characterizes a configuration of the biofuel-using diesel power generation system 10. As shown in FIG. 1, the diesel power generation system 10 of the present embodiment is provided with a first fuel reservoir 12 for storing 650 liters of palm oil, for example, as biofuel corresponding to one day's consumption, a diesel engine 14 which is driven using the biofuel supplied from the first fuel reservoir 12 and in the present embodiment exhibits an output of 750 kw, and a generator 16 which generates electric power by the driving force of the diesel engine 14.

In this embodiment, specifically, the palm oil used as biofuel is RBD palm stearin oil shown in Table 1 as shown below.

TABLE 1

| Test items | Test method | Unit | Measurement result |
|---|---|---|---|
| Fatty acid methyl ester content | EN 14103 | mass % | 0.1 |
| Density@60° C. | ISO 12185 | kg/m 3 | 881.5 |
| Viscosity@100° C. | ISO 3104 | cSt | 7.782 |
| Flash point (PMCC) | ISO 2719 | ° C. | 252.0 |
| Sulfur content | ISO 8754 | mass % | <0.01 |
| Residual carbon content (Micro method) | ISO 10370 | mass % | 0.26 |
| Sulfated ash content | JIS K 2272 | mass % | <0.001 |
| Moisture | ISO 3733 | vol % | 0.03 |
| Sediment | ISO 10307 - 1 | mass % | <0.01 |
| Copper corrosion (3 hr@50° C.) | ASTM D 130 | — | 1 a |
| Oxidation stability | EN 14112 | hr | 13.1 |
| Acid value | ASTM D 664 | mgKOH/g | 0.29 |
| Iodine value | ISO 3916 | — | 34 |
| Linolenic acid methyl ester | EN 14103 | mass % | <0.1 |
| Methanol | EN 14110 | mass % | <0.01 |
| Monoglyceride | EN 14105 | mass % | <0.5 |
| Diglyceride | EN 14105 | mass % | 8.005 |
| Triglyceride | EN 14105 | mass % | 91.296 |
| Free Glycerin | EN 14105 | mass % | <0.025 |
| Alkali (Na + K) | ISO 10478 | mg/kg | <1 |
| Metal Ca | EN 14538 | mg/kg | 3 |
| Metal Mg | EN 14538 | mg/kg | <1 |
| Phosphorus | ISO 10478 | mg/kg | 3 |
| Silicon ISO | 10478 | mg/kg | <1 |
| Cloud point | ISO 3015 | ° C. | 36 |
| Pour point | ISO 3016 | ° C. | 35 |
| Plugging point | IP 309 | ° C. | 42 |
| Ash | ISO 6245 | mass % | 0.001 |
| Low calorific value | JIS K 2279 | kJ/Kg | 36,553 |
|  |  | Kcal/kg | 8,703 |
| Reference: Low calorific value (Class A Heavy Oil) |  | kJ/Kg | 39,100 |
| Reference: Low calorific value (Gasoline) |  | kJ/Kg | 34,600 |

The diesel engine 14 is driven at a desired high efficiency under a predetermined temperature condition which is within a first temperature range, which range is specifically of 80° C. to 100° C. The optimum temperature at which the high efficiency is drawn varies depending on temperature, humidity, atmospheric pressure and the like within this first temperature range, but the correlation of which has already been clarified and publicly known based on the past achievement. Since it is out of the gist, the explanation here will be omitted.

The system 10 also includes a first fuel feed circuit 18 that connects the first fuel reservoir 12 and the diesel engine 14 and through which biofuel flows, a first fuel feed pump 20 which supplies the biofuel of the first fuel reservoir 12 to the diesel engine 16, and a first fuel heater 22 interposed in a portion of the first fuel feed circuit 18 on the downstream side of the first fuel feed pump 20. The biofuel supplied by the first fuel pump 20 is heated by the first fuel heater 22 to a second temperature range being set lower than the above first temperature range, specifically, a temperature range of 60 OC to 80° C.

In this embodiment, the first fuel heater 22 uses the heated hot water utilizing the exhaust heat discharged from the above-described diesel engine 14, and exchanges heat between the hot water and the biofuel circulating in the first fuel feed circuit 18 to heat the biofuel. Since the first fuel heater 22 is heated by heat exchange with hot water, the amount of heat is sufficient. Although there is no possibility of insufficient heat quantity for heating, the time constant is long so that it is difficult to control fine temperature.

In view of this, as the characteristic configuration of the present invention, in the system 10, a second fuel heater 24 for finely heating the biofuel flowing through this first fuel feed circuit 18 is interposed in a portion of the first fuel feed circuit 18 between the first fuel heater 22 and the diesel engine 14, a temperature sensor 26 for measuring the temperature of the biofuel immediately before flowing into the diesel engine 14 is interposed immediately upstream of the diesel engine 14 of the first fuel feed circuit 18. The system 10 further includes a control device 28 for controlling to heat the biofuel flowing into the diesel engine 14 by activating the second fuel heater 26 based on the measurement result of the temperature sensor 26, so that it is maintained between 80° C. and 100° C. which is defined as the first temperature range.

Specifically, the second fuel heater 24 is provided with an electric heater which is intermittently turned on and off under the control of the control device 28, and is constructed so as to supply biofuel accurately maintained at the target temperature to the diesel engine 14 so that the biofuel just before being supplied to the diesel engine 14 can be finely heated. Here, the electric heater constituting the second fuel heater 24 is attached to the outer peripheral portion of the pipe constituting the first fuel feed circuit 18 between the first fuel heater 22 and the diesel engine 14.

On the other hand, as described above, the temperature sensor 26 is interposed to a portion of the first fuel feed circuit 18 directly upstream of the diesel engine 14, and it is possible to measure the temperature of the biofuel immediately before flowing into the diesel engine 14. The control device 28 controls the second fuel heater 24 so that the temperature of the biofuel immediately before flowing into the diesel engine 14 is kept constant at a predetermined temperature between 80° C. and 100° C. which is the first temperature range. Here, FIG. 2 shows a control system diagram of the control device 28 in the fuel supply system in the present invention. Incidentally, although the control device 28 also controls the diesel engine 14 and the generator 16, it is not related to the biofuel heating control which is the gist of the present invention, so the explanation of the controls of the diesel engine 14 and the generator 16 will be omitted hereinafter.

The electric heater constituting the second fuel heater 24 divides a portion of the first fuel feed circuit 18 between the first fuel heater 22 and the diesel engine 14, into a plurality of portions, specifically, in this embodiment, for example, divided into three (3) parts, and each of the divided portions 24A to 24C is independently heated. Although the details will be described later, the control device 28 is configured to control the heat generation in an independent state of these divided portions 24A to 24C. In other words, based on the measurement result of the temperature sensor 26, the control device 18 selects not drive the electric heater 24, or heats at least one of the divided portions 24A, 24B, and 24C of the three divided portions 24A to 24C to generate heat. As described above, the control device 28 of this embodiment appropriately heats the divided electric heaters 24 so that the biofuel flowing through the first fuel feed circuit 18 can be more accurately heated to the target temperature.

In the first oil reservoir 12 described above, a third fuel heater 30 for heating the biofuel stored therein to a third temperature range being set lower than the second temperature range, for example, 50° C. to 70° C. is disposed. Similar to the above-described first fuel heater 22, this third fuel heater 30 uses the hot water heated by the exhaust heat from the diesel engine 14 to burn the biofuel in the first fuel reservoir 12 so as to be in the third temperature range.

Here, various devices for stably supplying the biofuel to the diesel engine 14 are interposed in the above-described first fuel feed circuit 18, so the outline will be described below.

First, a first return circuit 32 is connected between a portion of the above-described first fuel feed circuit 18 on the downstream side where the first fuel feed pump 20 is interposed and the first storage tank 12. In the first return circuit 32, a fine filter 34 for removing foreign matters of, for example, 10 μm is interposed. Further, a continuous automatic backwash filter 36 is interposed to a portion on the downstream side of the first fuel heater 22 in the first fuel feed circuit 18. A second return circuit 38 is connected between the continuous automatic backwash filter 36 and the above-described first fuel reservoir 12. In the second return circuit 38, a sludge collector 40 is interposed.

A first switching valve 42 is interposed on the downstream side of the continuous automatic backwash filter 36 in the first fuel feed circuit 18. Between the first switching valve 42 and the diesel engine 14, a first flow meter 44 is interposed. The first flow meter 44 is connected to the control unit 28, and the measurement result from this is used as a control factor of biofuel supply control in the control unit 28. The above-described temperature sensor 26 is interposed on immediately upstream side of the diesel engine 14 in the first fuel feed circuit 18, in other words, is interposed between the diesel engine 14 and the first flow meter 44. The first switching valve 42 is configured to be switched by the above-described control device 28, and its control manner will be described later.

On the other hand, a second fuel reservoir 48 storing biofuel for a plurality of days consumed, for example, 10 days consumption, is connected to the first fuel reservoir 12 through a second fuel feed circuit 46. A second fuel feed pump 50 for feeding the biofuel reserved in the second fuel reservoir 48 to the first fuel reservoir 12 is interposed in the second fuel feed circuit 46. A duplex filter 52 is also interposed in a portion of the second fuel feed circuit 46 immediately upstream of the second fuel feed pump 50.

In the second fuel reservoir 48, a fourth fuel heater 54 is disposed in so that the biofuel stored therein is heated to a fourth temperature range set to be lower than the above-mentioned third temperature range, for example, 35° C. to 60° C. Similar to the above-described first and third fuel heaters 22, 30, the fourth fuel heater 54 uses hot water heated by exhaust heat from the diesel engine 14 and heats the biofuel so as to be in the fourth temperature range.

The fourth temperature range is set higher than the melting point of palm oil used as biofuel in this embodiment. In detail, the melting point of palm oil is 27° C. to 50° C. It should be notated that the melting point of palm oil varies depending on the content of fatty acids such as stearic acid, and it has a melting point mainly in the range of 35° C. to 40° C. In view of this fact, in this embodiment, the fourth temperature range is set to 35° C. to 60° C. In this way, the palm oil as the biofuel stored in the second fuel reservoir 48 does not solidify, so that the liquid property can be reliably maintained. In addition, as described above, since the fourth temperature range is set to the minimum temperature range to prevent palm oil from solidifying, even during long-term storage, the effect that the high temperature deterioration of the palm oil is effectively prevented can be obtained.

A third fuel feed circuit 56 for returning the surplus biofuel discharged from the diesel engine 16 to the first fuel reservoir 12 is connected between the above-described diesel engine 16 and the first fuel reservoir 12. Since the biofuel discharged from the diesel engine 16 has a high temperature of 300° C. or higher, if it is returned to the first fuel reservoir 12 with keeping the temperature, the biofuel stored in this first fuel reservoir 12 is possibly exposed to unnecessarily high heat, resulting in high temperature deterioration of the biofuel therein. Accordingly, a first cooler 58 for lowering the temperature of biofuel being fed from the diesel engine 16 is interposed along the third fuel feed circuit 56. The first cooler 58 is configured to cool the biofuel by using water of normal temperature such as well water, tap water, industrial water or the like as the cooling water and exchanging heat with this cooling water has been done.

Further, a fourth fuel feed circuit 60 is interposed to a portion of the third fuel feed circuit 56 between the diesel engine 14 and the first cooler 58 and a portion of the first fuel feed circuit 18 between the first fuel heater 22 and the diesel engine 14. More specifically, one end of the fourth fuel feed circuit 60 is connected to a portion of the first fuel feed circuit 18 between the continuous automatic backwash filter 36 and the first switching valve 42. A first pressure regulating valve 62 that opens at a predetermined pressure is interposed in the fourth fuel feed circuit 60. That is, in this embodiment, when the biofuel being delivered through the first fuel feed circuit 18 is boosted to a predetermined pressure or higher, the first pressure regulating valve 62 opens and the biofuel in the first fuel feed circuit 18 is returned to the third fuel feed circuit 56, and then, after cooled by the first cooler 58, the biofuel is returned to the first fuel reservoir 12, so that safety is secured.

On the other hand, the system 10 further includes a third fuel reservoir 64 for storing Class-A heavy fuel oil which has good low temperature ignitability and is used as a fuel at the start of the system 10 as well as used as a flushing material for washing the diesel engine 14 at the suspending of the system 10. In this third fuel reservoir 64, Class-A heavy fuel oil having the same capacity as the biofuel in the above-described first fuel reservoir 12 is stored. A fifth fuel feed circuit 66 circulating Class-A heavy fuel oil therein is provided for connecting the third fuel reservoir 64 and the first switching valve 42. A third fuel feed pump 68 for feeding the Class-A heavy fuel oil stored in the third fuel reservoir 64 to the diesel engine 14 is interposed in the fifth fuel feed circuit 66. A duplex filter 70 is interposed in the portion of the fifth fuel feed circuit 66 between the third fuel reservoir 64 and the third fuel feed pump 68.

The control unit 28, at the time of startup and suspending (or flushing), activates the third fuel pump 68 and turns on the first switching valve 42 so that the input from the first fuel feed circuit 18 (that is, the inflow of biofuel) and the input from the fifth fuel feed circuit 66 (that is, the inflow of Class-A heavy fuel oil) is opened, so that the A heavy fuel oil is supplied as a flushing material from the third fuel reservoir 64 to the diesel engine 14. On the other hand, the control device 28, at the time of steady operation other than at the time of startup and suspending (or flushing), stops the activation of the third fuel feed pump 68 and turns on the first switching valve 42 so that the input from the fifth fuel feed circuit 66 is closed and the input from the first fuel feed circuit 18 is opened so that the biofuel is switched so as to be supplied to the diesel engine 14 from the first fuel reservoir 12.

A second switching valve 72 is interposed in a portion of the third fuel feed circuit 56 on downstream side of the diesel engine 14. A second flow meter 73 for measuring the flow rate of the fuel discharged from the diesel engine 14 is interposed in a portion of the third fuel feed circuit 56 between the diesel engine 14 and the second switching valve 72. Like the first flow meter 42, the second flow meter 73 is connected to the control unit 28, and the measurement result therefrom is used as a control factor of the diesel engine 14 in the control unit 28. The second switching valve 72 is configured to be switched by the above-described control device 28, but its control manner will be described later. The second switching valve 72 and the third fuel reservoir 64 are connected by a sixth oil supply circuit 74 for returning excess Class-A heavy fuel oil discharged from the diesel engine 14 to the third fuel reservoir 64.

Here, at the time of starting and terminating (or flushing), the control device 28 sets the second switching valve 72 to close the output to the third fuel feed circuit 56, opens the output to the sixth fuel feed circuit 74, and performs switching control so that Class-A heavy fuel oil discharged from the diesel engine 14 flows through the sixth fuel feed circuit 74. On the other hand, during steady operation other than starting and terminating, the control device 28 sets the second switching valve 72 to open the output to the third fuel feed circuit 56, and to close the output to the sixth oiling circuit 74, and carries out switching control so that the biofuel discharged from the diesel engine 14 circulates through the third fuel feed circuit 56 and is returned to the first fuel reservoir 12.

Furthermore, a second cooler 76 for lowering the temperature of the heavy oil A being fed is interposed in the sixth fuel feed circuit 74. Like the above-described first cooler 58, the second cooler 76 is configured to cool Class-A heavy fuel oil by exchanging heat with the cooling water.

On the other hand, a portion of the above-described fifth fuel feed circuit 66 between the first switching valve 42 and the third fuel feed pump 68 and a portion of the sixth fuel feed circuit 74 between the first cooler 76 and the second cooler 76 is connected to each other by a seventh fuel feed circuit 78. A second pressure regulating valve 80 which is set to be opened at a predetermined pressure is interposed in the seventh fuel feed circuit 78. Thus, in this embodiment, when the Class-A heavy fuel oil being fed by the fifth fuel feed circuit 66 is boosted to a predetermined pressure or more, the second pressure regulating valve 80 is opened and the A heavy foil in the fifth fuel feed circuit 66 is returned to the third fuel reservoir 64 via the sixth fuel feed circuit 74, and thus safety is guaranteed.

A third switching valve 82, which is switched and controlled by the control unit 28, is interposed in the sixth fuel feed circuit 74. Furthermore, the system 10 is provided with a recovery tank 84 for collecting a mixture of flushed Class-A heavy fuel oil and biofuel discharged from the diesel engine at the time of terminating and an eighth fuel feed circuit 86 connecting the recovery tank 84 and the third switching valve 82. At the time of startup, the control unit 28 closes the output to the eighth fuel feed circuit 86 by opening the third switching valve 82, opens the output to the sixth fuel feed circuit 74 to discharge Class-A heavy fuel oil from the diesel engine 14 performs switching control so that the Class-A heavy fuel oil passed through the sixth fuel feed circuit 74 is returned to the third fuel reservoir 64, on the other hand, at the time of terminating, the third switching valve 82 is opened to open the output to the eighth fuel feed circuit 86, and is closed the output to the sixth fuel feed circuit 74, and the switching control is performed so that the mixture of heavy Class-A heavy fuel oil and biofuel which is flushed and discharged from the diesel engine 14 is recovered to the recovery tank 84 via the eighth fuel feed circuit 86.

As described above, since the diesel power generation system using the biofuel 10 of the present embodiment is configured, the biofuel to be consumed per day is stored in the first fuel reservoir 12, on the other hand, in order to stably supply the biofuel to the first fuel reservoir 12, the second oil reservoir 48 storing ten (10) days of biofuel is connected to the first fuel reservoir 12 through the second fuel feed circuit 46. As a result, even if supply of biofuel stops for one week for some reason, the system 10 can continue to supply electricity without problems and continue to supply electricity.

The biofuel stored in the second fuel reservoir 48 is heated by the fourth fuel heater 54 in the fourth temperature range so that the biofuel is liquefied without being solidified, and prevents high temperature deterioration. In this manner, in response to the operation of the second fuel pump 50 from the second fuel reservoir 48, the biofuel supplied to the diesel engine 14 from the first fuel reservoir 12 and consumed is reliably replenished into the first fuel reservoir 12.

Figure 2:
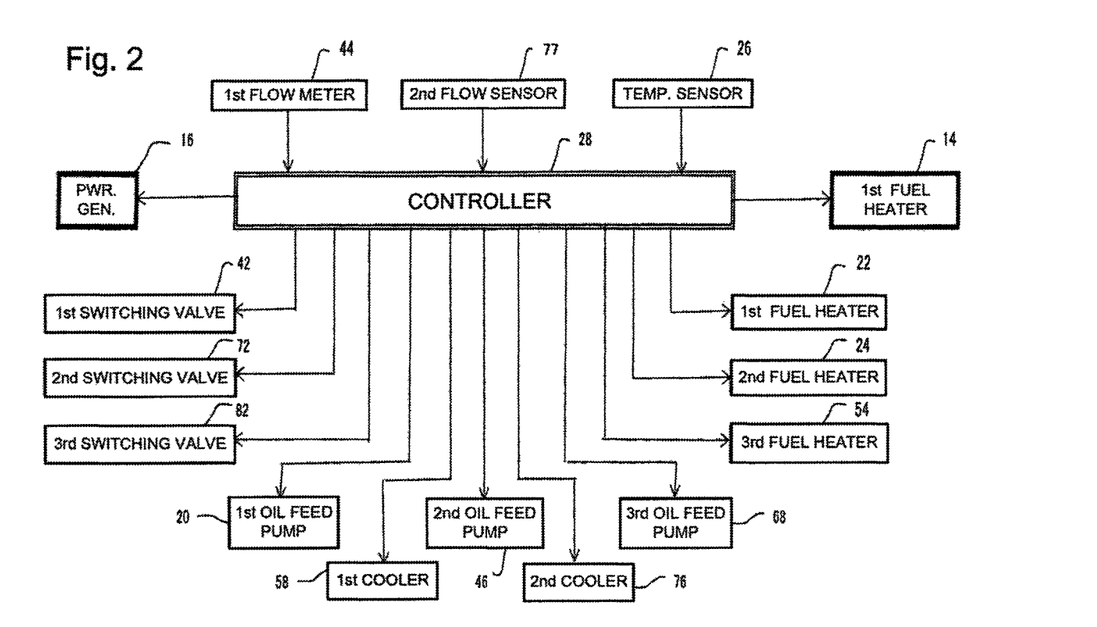
FIG. 2 is a block diagram showing a control system of the control device shown in FIG. 1.

As described above, in a state where the biofuel sufficient to be consumed on that day is stored in the first fuel reservoir 12, with reference to the block diagram of FIG. 2 and the flowcharts of FIGS. 3 to 7, the control procedure of the control device 28 executed to drive the diesel engine 14, in particular, the control of the supply of fuel to the diesel engine 14 and the control procedure of the temperature control of the fuel supplied to the diesel engine 14 will be described.

Figure 3:
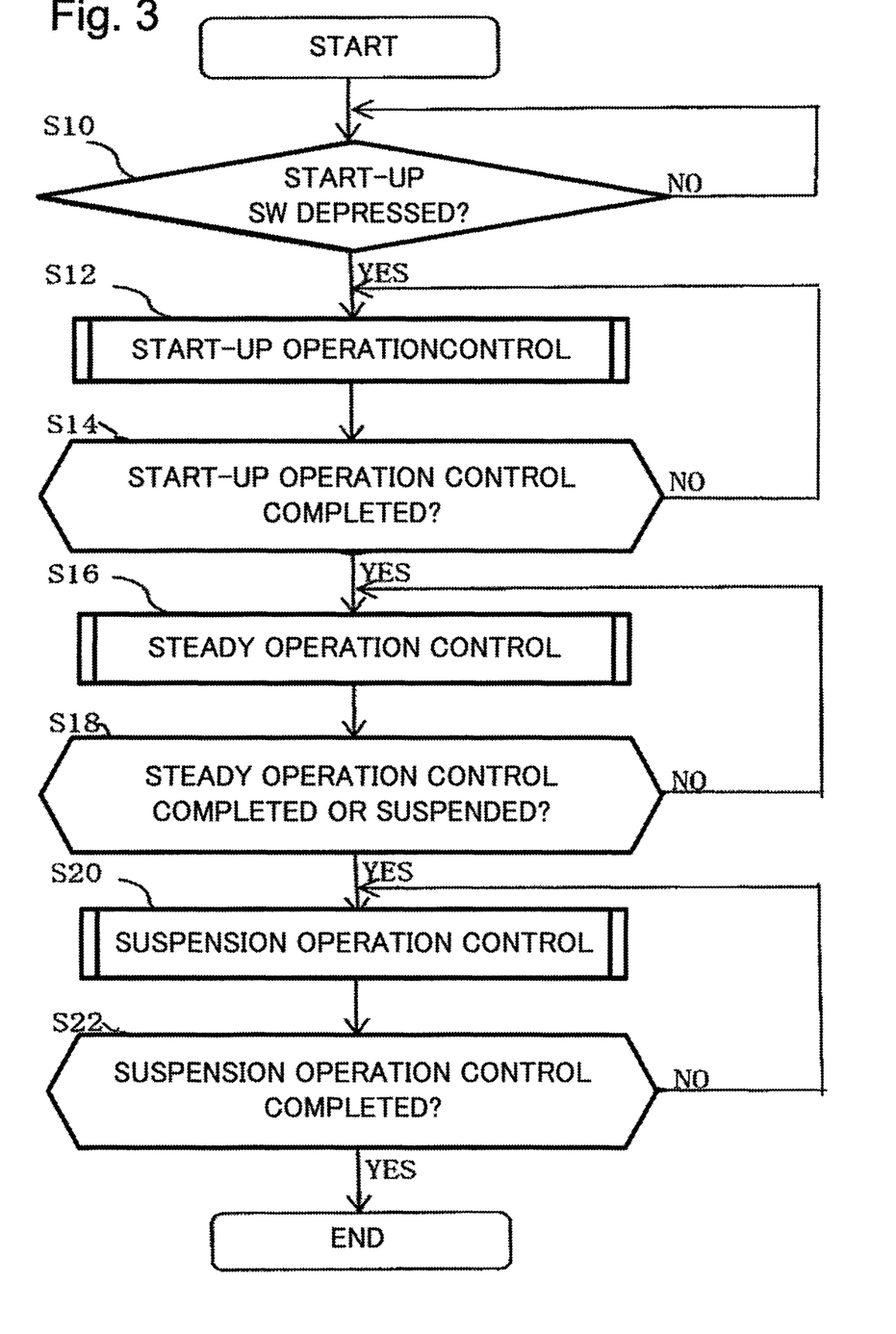
FIG. 3 is a flowchart showing a main routine as a control mode of the control device shown in FIG. 2.

First, at the control device 28, it is determined whether the diesel engine 14 is activated or not, and wait until the start operation mode is set (NO in S10) by a start switch (not shown) being pushed. When the start switch is pushed and the start operation mode is set (YES in S10) in this step S10, a subroutine of startup control is executed (S12). This subroutine of startup control will be described later with reference to FIG. 4.

Next, it is determined whether the start operation mode of the diesel engine 14 has ended, and waits until the steady drive switch (not shown) is pushed and shifts from the start operation mode to the steady operation mode (NO in S14).

When the steady operation switch is pressed in step S14 and the steady operation mode is set (YES in S14), the subroutine of the startup control is stopped and the subroutine of the steady operation control is executed (S16). This steady-state control subroutine will be described later with reference to FIG. 5.

Then, it is determined whether the steady operation of the diesel engine 14 has ended, and waits until the stop switch (not shown) is pressed to shift from the steady operation mode to the suspending operation mode (NO in S18). When the stop switch is pressed in step S18 and the suspending operation mode is set (YES in S18), the subroutine of the steady operation control is stopped, and the subroutine of the suspending operation control is executed (S20). This subroutine of suspending operation control will be described later with reference to FIG. 6.

As described above, since the main routine in the control mode of the control device 28 is configured, it is possible to surely divide the diesel engine 14 into the diesel engine 14 at the time of startup, steady, and suspending operations of the system 10, the fuel supply control operation optimum for the mode is executed.

Next, with reference to FIG. 4 to FIG. 7, the control procedure of the three modes executed as subroutines in the main routine shown in FIG. 3 will be described. First, the control procedure of the startup control in the above-described step 12 will be described with reference to FIG. 4.

Figure 4:
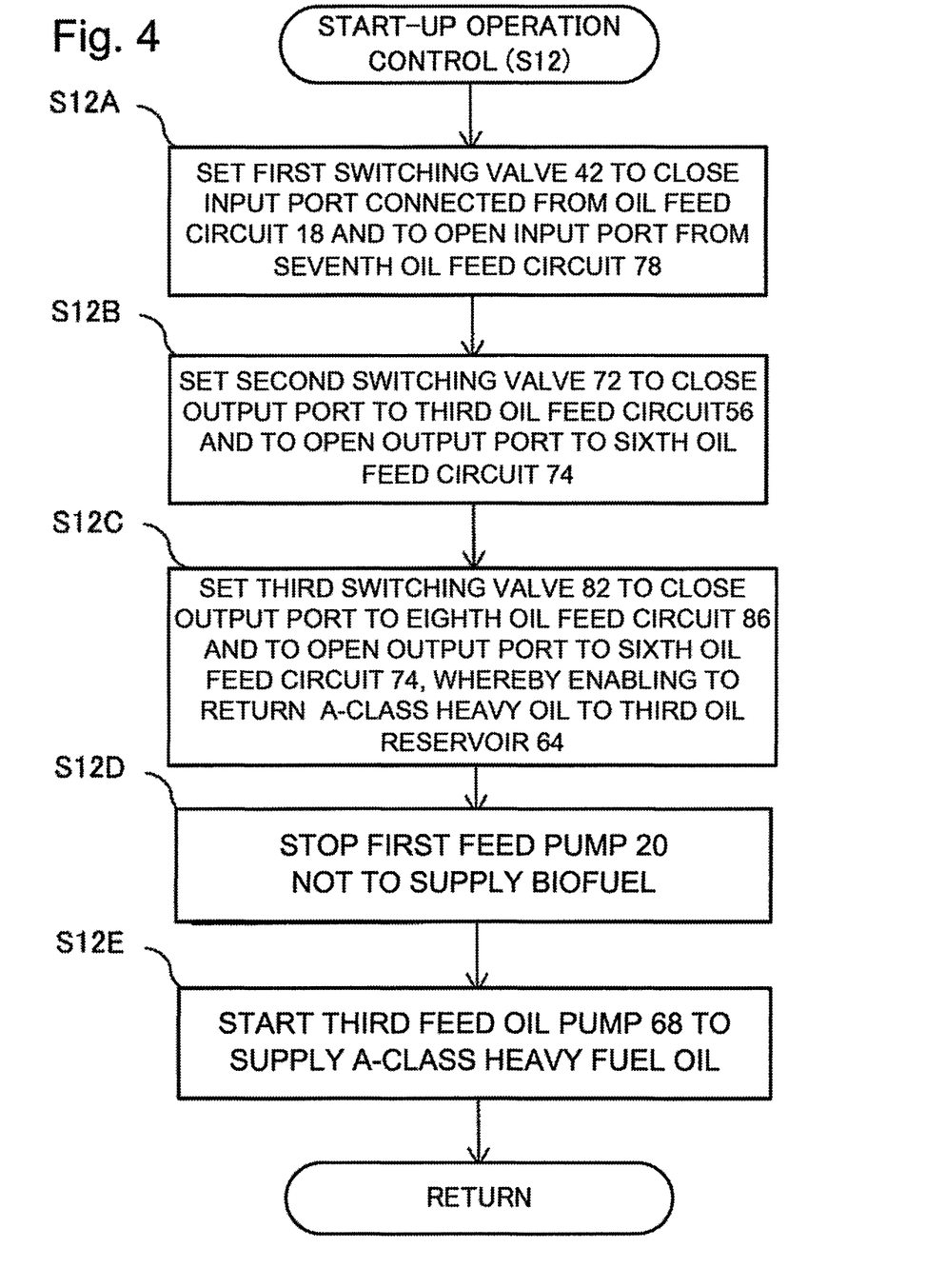
FIG. 4 is a flowchart showing a subroutine of startup control in the main routine shown in FIG. 3.

When this start-up control is started, the control device 28 turns on the first switching valve 42 to close the input from the first fuel feed circuit 18 and opens the input from the seventh fuel feed circuit 78 (S12A). Next, the second switching valve 72 is controlled to close the output to the third fuel feed circuit 56 and to open the output to the sixth fuel feed circuit 74 (S12 B). Then, the third switching valve 82 is controlled to close the output to the eighth fuel feed circuit 86 and to open the output to the sixth fuel feed circuit 74 (S12C). In this manner, a situation is created in which the Class-A heavy fuel oil discharged from the diesel engine 14 can be returned to the third oil reservoir 64.

On the other hand, the activation of the first fuel feed pump 20 is stopped and the biofuel is not supplied (S12D), the third fuel feed pump 68 is activated to feed Class-A heavy fuel oil from the third fuel reservoir 64 to the diesel engine 14 (S12E). As a result, biofuel having a high flash point is not supplied to the diesel engine 14, but only Class-A heavy fuel oil having a low flash point is supplied. Therefore, the diesel engine 14 will start very well even if it is in a cold state.

Figure 5:
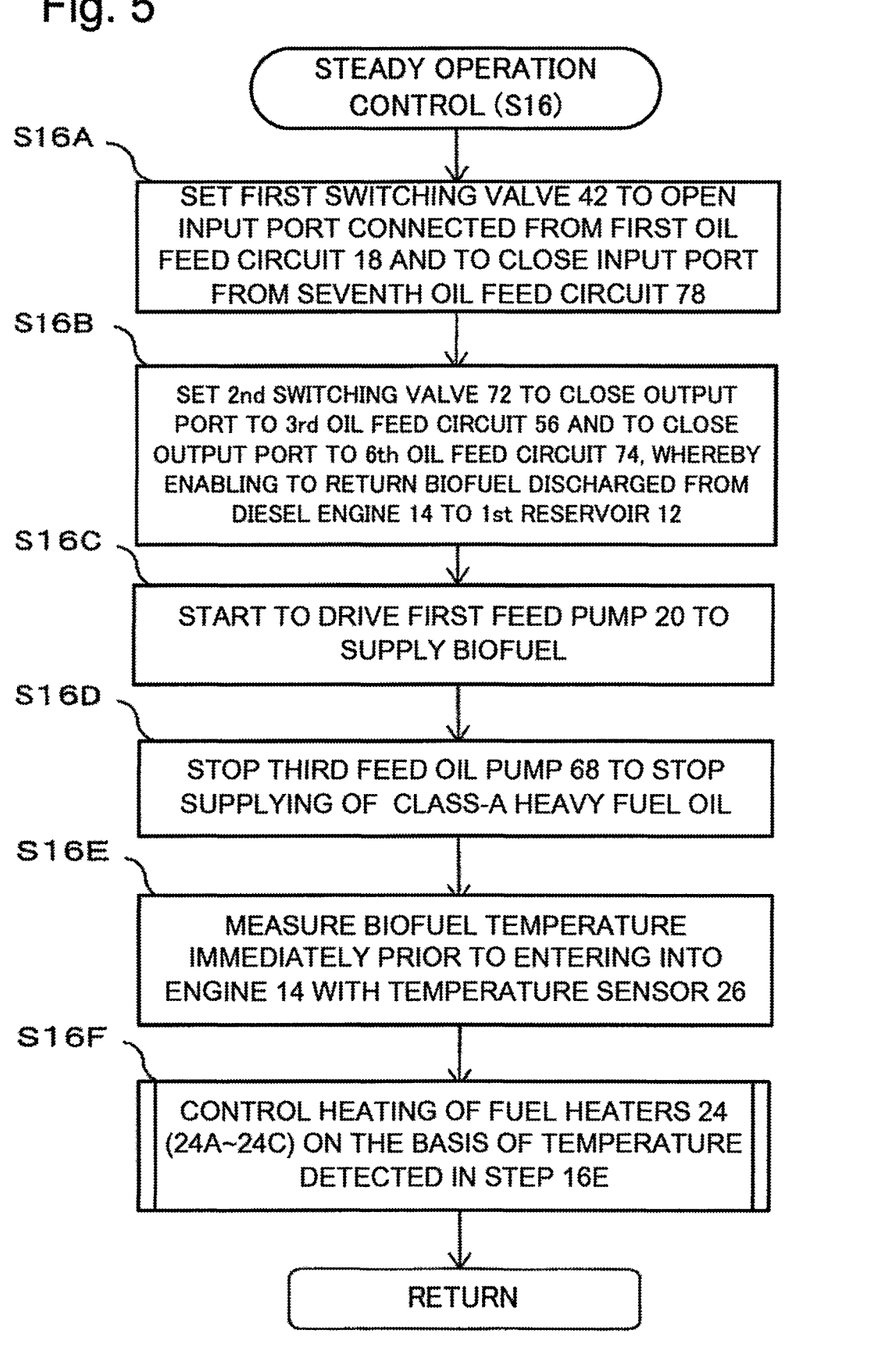
FIG. 5 is a flowchart showing a subroutine of steady operation control in the main routine shown in FIG. 3.

When it is determined that the diesel engine 14 has been warmed up after a predetermined time has elapsed after the start-up control has been carried out, the diesel engine 14 is warmed up, and the so-called warm-up operation is determined to have been completed, the operator presses a steady drive switch, the operation mode is switched from the start-up mode to the steady operation mode. As a result, the start-up control is terminated and the steady operation control is started. When this steady operation control is started, the control device 28 opens the input from the first fuel feed circuit 18 by the first switching valve 42 and closes the input from the seventh fuel feed circuit 78 (S16A). Next, the second switching valve 72 opens the output to the third fuel feed circuit 56 and closes the output to the sixth fuel feed circuit 74, to allow the flow of the biofuel discharged from the diesel engine 14, and then to return the discharged biofuel to the first fuel reservoir 12 (S16B). In this way, a situation is created in which the biofuel discharged from the diesel engine 14 can be returned to the first fuel reservoir 12.

Then, the first oil feed pump 20 is activated to start supply of biofuel (S16C), the activation of the third fuel feed pump 68 is stopped, and biofuel is supplied from the first fuel reservoir 12 to the diesel engine 14 (S16D). As a result, the diesel engine 14 can be driven by the biofuel in a state in which the warm-up operation has been sufficiently completed, and then the power generation by the generator 16 is started.

Here, when the biofuel starts to be supplied from the first fuel reservoir 12 to the diesel engine 14, the temperature of the biofuel just before entering the diesel engine 14 is measured using the temperature sensor 26 (S16E), based on the detected temperature of the biofuel, the heat generation control of the second fuel heaters 24 (24A to 24C) is performed (S16F). Since the mode of heat generation control of the second fuel heater 24 is one of the features of the present invention, this will be described later with reference to FIG. 7.

Since the steady-state control subroutine is configured in this way, the diesel engine 14 is stably driven by using the biofuel, and as a result, the generator 16 driven by the diesel engine 14 also stably driven to generate power.

Figure 6:
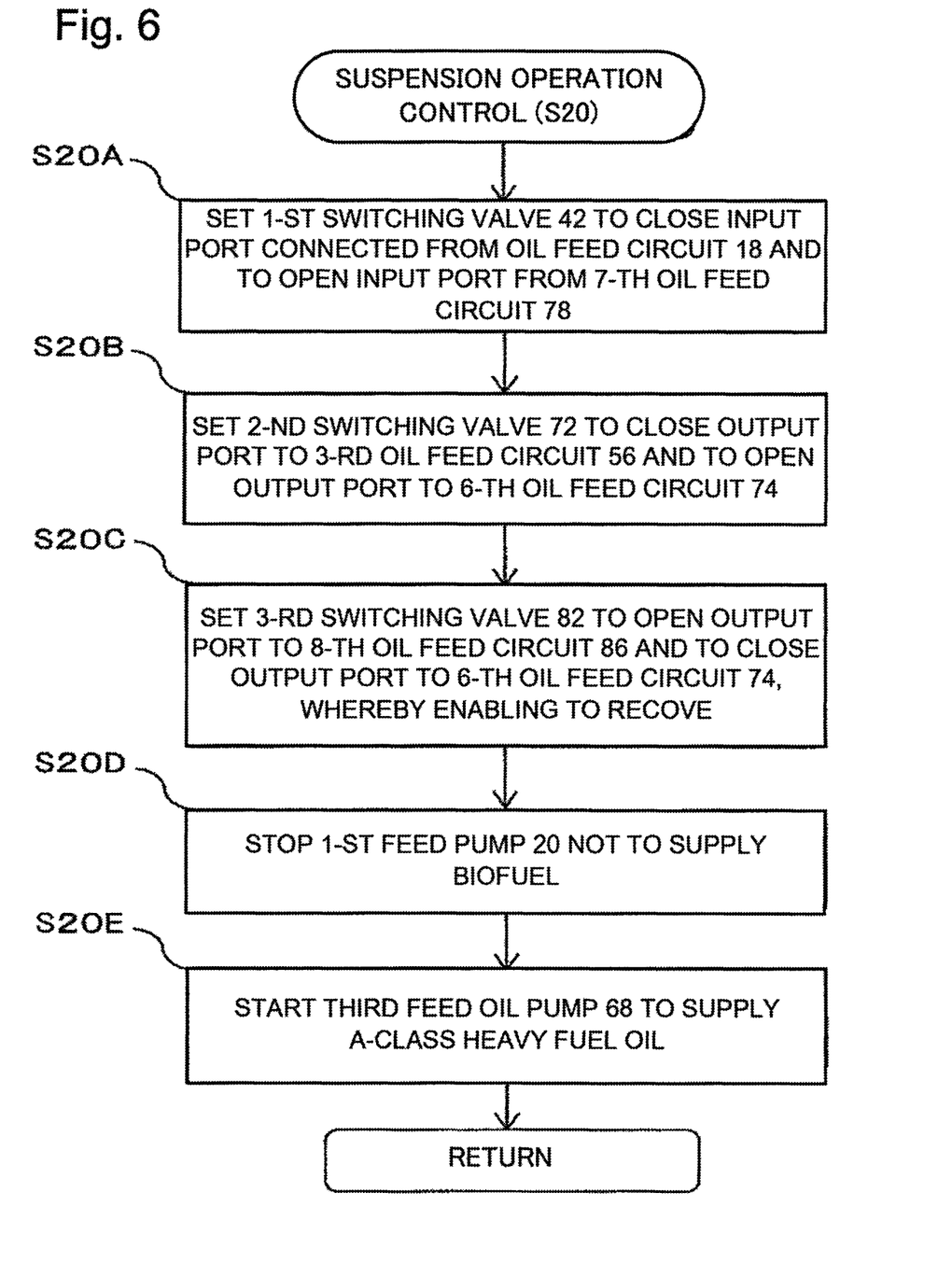
FIG. 6 is a flowchart showing a subroutine of suspending control in the main routine shown in FIG. 3.

On the other hand, in the situation where the steady-state control is executed and the power generation operation in the generator 16 is continued by the drive of the diesel engine 14, for example, when periodic maintenance or any failure occurs, the operator presses an suspension switch (not shown) to shift from the steady operation mode to the terminate operation mode. As a result, the steady operation control is finished and the control at the suspending time is started. When this suspending control is started, the control device 28 switches the first switching valve 42 to close the input from the first fuel feed circuit 18 and to open the input from the seventh fuel feed circuit 78 (S20A).

Then, the second switching valve 72 is controlled to close the output to the third fuel feed circuit 56 and to open the output to the sixth fuel feed circuit 74 (S20B). Further, the third switching valve 82 is operated to open the output to the eighth fuel feed circuit 86 and to close the output to the sixth fuel feed circuit 74 (S20C). In this way, a situation is created in which the flushed fuel discharged from the diesel engine 14 can be collected in the recovery reservoir 84.

On the other hand, the activation of the first fuel feed pump 20 is stopped and the biofuel is not supplied (S20D), the third fuel feed pump 68 is activated to feed the Class-A heavy fuel oil from the third fuel reservoir 64 to the diesel engine 14 (S20E). As a result, since only Class-A heavy fuel oil is newly supplied to the diesel engine 14, the biofuel is discharged from the diesel engine 14, in other words, and the biofuel is flushed.

As described above, since the subroutine of the suspending control is configured, the diesel engine 14 is stably stopped in a state in which the heavy fuel oil A is supplied to the diesel engine 14, and the inside of the diesel engine 14 is flushed, a state in which biofuel does not remain in the diesel engine 14 is achieved. As a result, even if the diesel engine 14 stops and enters into a cold state, no biofuel remains therein, so that no problem arises.

In addition, the fuel which is flushed and discharged from the diesel engine 14 is initially in a state in which the biofuel and the Class-A heavy fuel oil are mixed. When this mixture is returned to the first fuel reservoir 12 storing the biofuel, the first fuel reservoir 12 is contaminated with Class-A heavy fuel oil while when this mixture is returned to the third fuel reservoir 64 that stores Class-A heavy fuel oil, the third fuel reservoir 64 is contaminated with biofuel. For this reason, as described above, the third switching valve 82 is controlled to be switched, and the fuel (a mixture of the biofuel and the Class-A heavy fuel oil) discharged from the diesel engine 14 at the suspending operation is collected in the recovery tank 84 without being returned to the first and third fuel reservoirs 12 and 64. As a result, it is possible to flush the diesel engine 14 and completely remove the biofuel from within the diesel engine 14, and the fuel used for the flushing and discharged from the diesel engine 14 is separately recovered in the recovery tank 84. In this way, contamination of the first and second fuel reservoirs 12 and 64 is effectively prevented.

Figure 7:
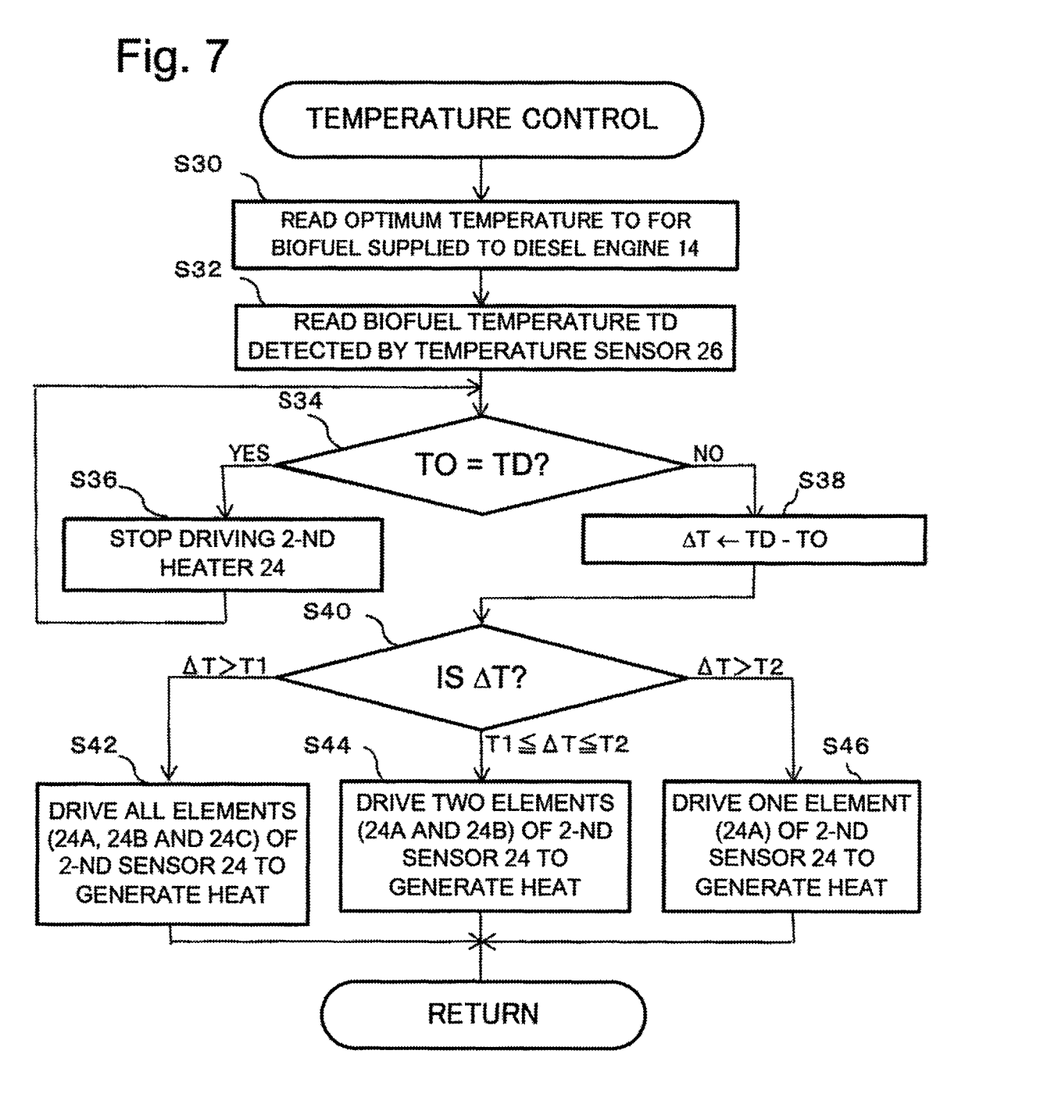
FIG. 7 is a flowchart showing a subroutine of temperature control in the subroutine of steady operation control shown in FIG. 5.

Next, with reference to FIG. 7, a control mode of heat generation control of the second fuel heater 24 in step S16F described in the above described steady operation control will be described.

At first, as the heat generation control of the second fuel heater 24 in a state where the steady operation control is being executed, the reading operation of the optimum temperature (that is, the target temperature) T0 of the biofuel supplied to the diesel engine 14 is performed (S30). This optimum temperature T0 is appropriately prescribed depending on room temperature and humidity, atmospheric pressure, etc. In this embodiment, it is stored in a ROM (not shown) as a correlation map.

Next, the detected temperature TD of the biofuel from the temperature sensor 26 is read (S32), and it is subsequently judged whether or not the optimum temperature T0 and the detected temperature TD coincide (S34). Here, when it is determined that they match (YES in S34), the temperature of the biofuel supplied to the diesel engine 14 is the same as the optimum temperature T0. The heat generation drive by the second fuel heater 24 is stopped (S36), and the process returns to the above-described step S34. Again, it is determined whether or not the optimum temperature T0 and the detected temperature TD match. On the other hand, when it is determined that they do not coincide (NO in S34), the detected temperature TD does not reach the optimum temperature T0. Next, a difference ΔT between the optimum temperature T0 and the detected temperature TD is calculated (S38). Then, based on the calculated degree of ΔT, in order to raise the detected temperature TD to the optimum temperature T0, the mode of each heat generation control of the divided three portions 24A, 24B and 24C of the second fuel heater 24 is set to (S40).

In this embodiment, the determination of the degree of the difference ΔT is set as follows. That is, the difference between the maximum value T1max in the first temperature range and the lowest value T2min in the second temperature range defines the maximum width Tmax. On the other hand, the difference between the lowest value T1min in the first temperature range and the highest value T2max in the second temperature range defines the minimum width Tmin. Then, two threshold values T1 and T2 for equally dividing the interval between the maximum width Tmax and the minimum width Tmin are determined. When the difference ΔT is larger than the larger threshold value T1 (ΔT>T1), that is, when the difference between the detected temperature TD and the optimum temperature T0 is large, the biofuel should be strongly heated by the second fuel heater 24, so that all divided parts (24A, 24B and 24C) in the second fuel heater 24 are driven to generate heat (S42).

Further, when the difference ΔT is between the two threshold values T1 and T2 (T1≥ΔT≥T2), that is, when the difference between the detected temperature TD and the optimum temperature T0 is medium, it is sufficient to heat it appropriately with the second fuel heater 24, thereby controlling to drive the two divided portions (24A and 24B) of the second fuel heater 24 to generate heat (S44). Further, when the difference ΔT is smaller than the smaller threshold value T2 (ΔT<T2), that is, when it is determined that the difference between the detected temperature TD and the optimum temperature T0 is small, it is a situation where biofuel should be heated slightly strongly by the second fuel heater 24, thereby controlling so that only one divided portion (24A) of the second fuel heater 24 is driven to generate heat (S44).

As in the control device 28 of this embodiment, in the heating control of the biofuel supplied to the diesel engine 14, firstly, the biofuel is heated and controlled by the first fuel heater 22 so as to be within the second temperature range, furthermore, in the second fuel heater 24, the divided portions 24A, 24B, 24C are appropriately subjected to heat generation control in accordance with the difference ΔT between the optimum temperature T0 in the diesel engine 14 at the target temperature and the actual measured temperature TD. As a result, the biofuel flowing into the diesel engine 14 is supplied in a state that coincides with the optimum temperature T0 and high efficiency in the diesel engine can be effectively achieved.

The present invention is not limited to the configuration and numerical values of the above-mentioned embodiments, and various modifications can be made without departing from the gist of the present invention.

For example, in the above-described embodiment, the palm oil is used as the biofuel. However, the present invention is not limited to the use of the palm oil at all, and examples thereof include rapeseed oil, soybean oil, jatropha and sunflower, it is needless to say that various biofuels such as seed oil can be used. However, since the biofuel other than the palm oil does not solidify at normal temperature and maintains its liquid property, in the second oil storage tank 48 storing this, the fourth fuel heater 54 described in the above embodiment becomes unnecessary.

In the above-described embodiment, the capacity of the first fuel reservoir 12 is described to have a capacity of 650 liters. However, the present invention is not limited to such a value at all, but may be applied to the output of the diesel engine, it goes without saying that it changes accordingly.

Further, in the above-described embodiment, the capacity of the second fuel reservoir 48 is explained as having a capacity 10 times as large as that of the first fuel reservoir 12, but the present invention is limited to such a value at all, needless to say, if it can cover the consumption amount for several days, it can be freely set.

In the above-described embodiment, one or single diesel engine 14 has been described as being provided, but the present invention is not limited to such a number of diesel engines, but in brief, it corresponds to the required power generation capacity, it is important to obtain the engine output, and it goes without saying that the number of power units to be installed can be freely selected.

In the above-described embodiment, the electric heater constituting the second fuel heater 24 is divided into four. However, the present invention is not limited to such a configuration, it goes without saying that the number can be arbitrarily set.

INDUSTRIAL APPLICABILITY

As described above, in the diesel power generation system using the biofuel of the present invention, in the first fuel feed circuit 18 for supplying this biofuel to the diesel engine 14 from the first fuel reservoir 12 for storing the biofuel by the control device 28, first, the biofuel circulating therein is heated by the first fuel heater 22 so as to be roughly in the second temperature range, immediately before being supplied to the diesel engine 14, the second fuel heater 24 heats the diesel engine 14 so that it is accurately held in the first temperature range where the diesel engine 14 is driven at the desired efficiency, as a result, in a situation using biofuel, a power generation system that can make diesel power generation practically effective can be provided. Especially power generation without using fossil fuel is effectively achieved, and the possibility of its use is immeasurable.

The invention claimed is:

1. A diesel power generation system having:
    a steady power generation (PG) operation mode in which biofuel is used as default fuel to drive a diesel engine for electric power generation;
    a PG operation suspension mode which suspends the steady PG operation mode by giving a flushing processing to the engine with liquid fossil fuel as default fuel and which processing works as preparation for a next power generation operation; and
    a start-up operation mode in which liquid fossil fuel is used as default fuel to start-up and warm up the diesel engine,
comprising:
    a biofuel reservoir for storing biofuel;
    a fossil fuel reservoir for storing liquid fossil fuel;
    a surplus-fuel-mixture recovery tank for recovering a mixture of surplus biofuel and surplus fossil fuel, discharged from said diesel engine;
    a fuel switching valve including two input ports connected to said biofuel and liquid fossil reservoirs via respective feed oil circuits, respectively, and one output port connected to the diesel engine via a feed oil circuit, wherein said fuel switching valve being controlled by a first control signal to select one of said two input ports according to a value of said first control signal, and allowing the selected one input port to communicate to said one output port, whereby the fuel of the reservoir connected to the selected one input port may be supplied to the diesel engine;
    a surplus-fuel-return-destination (SFRD) switching valve having one input port connected via a feed oil circuit to a surplus fuel exit of said diesel engine and three output ports that are respectively connected to a return port of said biofuel reservoir, a return reservoir of said liquid fossil fuel reservoir and an input port of said surplus-fuel-mixture recovery tank, said DFRD switching valve communicating said one input port in response to a second control signal to either one output port of said three output port of the SFRD switching valve, whereby returning or collecting surplus fuel generated in said diesel engine to proper one of said biofuel reservoir, liquid fossil fuel reservoir and surplus-fuel-mixture recovery tank;
    a control device controlling said fuel switching valve and SFRD switching valve to cause the switching of the respective valves in said steady PG operation mode, PG operation suspension mode, and start-up operation mode, generate the first and second control signals on the basis of such user instructions as starting-up of generator, starting steady operation of generator and suspension generator operation, status signals indicative of a status of the diesel engine,
    wherein said control device executing the following steps of:
    (A) detecting, during the system is in either one operation mode of the steady PG operation mode, PG operation suspension mode and start-up operation mode, a user operation or user instructions and/or a change in the system status, and judging whether there is occurring a mode change from a current operation mode to a next operation mode;
    (B) where it is judged the system requires a mode change from the current operation mode to the next operation mode, and that a next default fuel that is to be used for the next operation mode will be different from the current default fuel that is being used for the current operation mode:
    (B-1) altering the value of said first control signal for said fuel switching valve into a value indicating that said fuel switching valve allows the fuel in the fuel reservoir for the next default fuel to flow therein; and
    (B-2) altering, at a time not earlier than a switching timing of said fuel switching valve, the value of the second control signal for said SFR switching valve into a value indicating a mixture of a current fuel surplus and a next fuel surplus is retuned to said surplus-fuel-mixture recovery tank, whereby enabling collecting surplus fuel mixture in the recovery tank.

2. The diesel power generation system according to claim 1,
    wherein in a case where the system is currently in current operation mode that is a steady PG operation mode, and receives the user instruction for operation suspension and then goes to a next operation that is a PG operation suspension mode;
    the control device controls:
    (b-1) said fuel switching valve, during the system remains in the steady PG operation mode, to select, to select said biofuel reservoir so that biofuel as default fuel for the steady PG operation mode may be supplied to the diesel engine and that the engine may run the steady PG operation, as well as controls said SFRD switching valve to select said biofuel reservoir as return destination for surplus biofuel, whereby enabling to collect the surplus biofuel only including biofuel to the biofuel reservoir during the time period of the steady PG operation mode and enabling the re-use of the returned biofuel;
    (b-2) said fuel switching valve, when the system goes to the suspension mode from the steady PG operation mode, to switch over to the liquid fossil fuel reservoir while controlling said SFRD switching valve to switch the return destination of surplus fuel from said biofuel reservoir to said surplus-fuel mixture recovery tank at not earlier timing than switching timing of said fuel switching valve, whereby realizing the flushing of the diesel engine together with the recovery of the surplus fuel mixture from biofuel as well as fossil fuel.

3. The diesel power generation system according to claim 2,
    wherein after the first control signal for said fuel switching valve is altered from biofuel selection to liquid fossil fuel selection and then a predetermined time period for flushing elapses, said control device stops said diesel engine.

4. The diesel power generation system according to claim 3,
    wherein said control device controls the diesel engine to initiate a start-up operation mode for warming-up of the engine, said engine having completed a flushing of the engine through a PG operation suspension mode and the start-up operation mode is in response to a predetermined start instruction.

5. The diesel power generation system according to claim 4,
Wherein said control device controls:
(C) in the start-up operation mode,
(C1) setting the first control signal into a value with which the input-port for the liquid fossil fuel reservoir of said fuel switching valve is communicated to the fuel input port of the diesel engine so that liquid fossil fuel from said liquid fossil fuel reservoir may be supplied via said fuel switching valve to the diesel engine, and to set the second control signal into a value with which that output port, of the SFRD switching valve, connected to the fossil fuel reservoir is communicated to the input port of the SFRD switching valve, so that surplus fossil fuel discharged from the diesel engine may be returned to said fossil fuel reservoir;
(C2) deciding that the operation mode is moving from the start-up operation mode to a steady PG operation mode based on by monitoring a warming-up statues of the diesel engine and/or intervention by a user;
(C3) when the above decision is made, setting the first control signal into a value with which the output port of the fuel switching valve connected to the diesel engine to let the output port of said fuel switching valve connected to the diesel engine to communicate to the input port, of the fuel switching valve, whereby switching over fuel supplied to the engine from fossil fuel to biofuel; and
(C4) controlling the SFRD switching valve to switch the return destination of the discharged surplus fuel to said biofuel reservoir from said fossil reservoir.

6. The diesel power generation system according to claim 4,
wherein the diesel power generation system includes:
a heater disposed at an upper stream position of the diesel engine, said heater is commanded by the control device to heat biofuel supplied from the biofuel reservoir, and
a temperature sensor disposed between the heater and diesel engine sensing a temperature of biofuel heated by the heater, to inform of the temperature data to the control device,
said control device controls:
(C) in the start-up operation mode,
(C1-1) to start heating with the heater, and to detect a temperature of the heated biofuel with the sensor;
(C2-1) to judge that when the temperature detected by the sensor reaches within a predetermined temperature range, the warming up of the engine has been made, and then move to the steady PG operation mode.

7. The diesel power generation system according to claim 1, further comprising a suspension button used by an operator;
wherein said control device decides, when the suspension button is operated during the steady PG operation mode, that the operation mode is shifted from steady PG operation mode to PG operation suspension mode.

8. The diesel power generation system according to claim 1,
wherein said SFRD switching valve includes a first three-way valve and second three-way valve disposed at a downstream position of the first three-way valve.

9. The diesel power generation system according to claim 6,
Wherein the heater includes hot-water heater utilizing cooling water for the diesel engine, and electrically driven heater disposed between a down-stream position of the hot water heater and the temperature sensor.

10. The diesel power generation system according to claim 1,
wherein a cooler for cooling surplus fossil fuel on an oil feed circuit between said SFRD switching valve and the fossil fuel reservoir.

11. The diesel power generation system according to claim 1,
wherein a cooler for cooling surplus biofuel on an oil feed circuit between said SFRD switching valve and the biofuel reservoir.

12. The diesel power generation system according to claim 1,
wherein the biofuel reservoir has a capacity to store biofuel for at least a single day consumption.

13. The diesel power generation system according to claim 1,
wherein said biofuel reservoir is connected to a large volume of biofuel reservoir in which biofuel for a plurality of days consumption is stored, and
a fuel feed pump for supplying and refilling biofuel reserved in the large volume of biofuel reservoir to the biofuel reservoir is provided.

14. The diesel power generation system according to claim 1,
wherein a first heater is provided within said biofuel reservoir and a second heater is provided within said large volume of biofuel reservoir, and the second heater of the large volume of biofuel reservoir may generate heat volume larger than that generated by the first heater of the biofuel reservoir.

15. The diesel power generation system according to claim 3,
wherein the switching from a start-up operation mode to steady PG operation mode is made when a predetermined time period of the initiation of the start-up operation mode elapses.

16. The diesel power generation system according to claim 1,
wherein the biofuel comprises palm oil and the liquid fossil fuel comprises Class A heavy oil.

* * * * *